United States Patent [19]

Navarro

[11] Patent Number: 5,788,147
[45] Date of Patent: Aug. 4, 1998

[54] STEAM TRAP

[76] Inventor: Vicente Blazquez Navarro, Torrelaguna 61—14° D., 28027 Madrid, Spain

[21] Appl. No.: 577,845

[22] Filed: Dec. 22, 1995

[30] Foreign Application Priority Data

Dec. 23, 1994 [ES] Spain .................................. 9402637

[51] Int. Cl.$^6$ .................................................. F16T 1/08
[52] U.S. Cl. ................................... 236/59; 236/93 R
[58] Field of Search ............................ 236/59, 93 R

[56] References Cited

U.S. PATENT DOCUMENTS

| | | | |
|---|---|---|---|
| 3,286,926 | 11/1966 | Domm et al. ........................... | 236/59 |
| 4,320,871 | 3/1982 | Kuroda et al. ......................... | 236/59 |
| 4,327,863 | 5/1982 | Foller .................................... | 236/59 |
| 4,471,906 | 9/1984 | Noguchi et al. ....................... | 236/59 |

FOREIGN PATENT DOCUMENTS 2010230  9/1970  Germany .................................. 236/59

*Primary Examiner*—William E. Tapolcai
*Attorney, Agent, or Firm*—Wolf, Greenfield & Sacks, P.C.

[57] ABSTRACT

The steam trap constitutes a miniaturized single block set, which regulator integral element are assembled inside a single part body with a ringing anchorage slot for the regulator filter and keyways for placement of the lugs of a washer acting as a wedge key, under which is located a guiding nut of the respective plug carrying spindle that forms part of the regulator. This washer has a polygonal passage inside which is located a V shaped portion of the guiding nut, preventing its turn whenever the plug carrying spindle is turned to effect the regulation, spindle which does furthermore pass through a bimetallic package and through another lower nut, which last two elements complete the regulator. The steam trap thus obtained does not have a cover, sealing joint and cover-main body joining elements, allowing the ready inspection and handling of the internal elements that make up the regulator.

1 Claim, 2 Drawing Sheets

STEAM TRAP

The invention refers to a improved steam trap, that incorporates the special feature that the elements that make up the corresponding trap regulator are assembled inside a single part body, being said elements capable of being duly inspected, assembled or disassembled as often as required without any difficulties whatsoever.

It is known a type of steam trap in which the elements that make up the regulator are assembled inside a body formed by two parts, one as the main body and the second one as the cover, being both parts screwed together. In this type of steam trap there is furthermore a third part screwed inside the main body and which constitutes the seat on which is established the passage for the regulating element acting as opening/closing element.

Said steam trap has the disadvantage that, to carry out the inspection and/or replacement of any internal element of the regulator, it is then necessary to remove the cover from the main body. Similarly, to effect the initial regulator assembly the cover must be removed and be later assembled.

Independently of the disadvantage posed by having at least two separate parts making up the external steam trap housing, with the added impact to its manufacturing cost, there is also a fundamental problem inherent to this type of steam trap, which is that the level of heat and humidity to which it is subjected during its operation frequently causes a seizure of the screw on assembly system when unscrewing is attempted. Furthermore, sealing joints are also required to try to prevent the steam leaks that are produced and take place through the joints and seals in the short term.

Sizes are reduced in order to try to avoid these problems, and a reduction in size means minimizing not only the costs of materials and manufacture, but also energy consumption, due to offering a lesser surface off which heat may be radiated outwards. Size reduction is achieved, in the current state of the art, by using stainless steels to replace cast carbon steel elements in the manufacture of the steam trap casing (main body and cover), which will house inside it the regulator (set of elements that effect the automatic condensate regulation and purging function). The use of stainless steels requires lesser thicknesses and dimensions, but brings about the considerable problem represented by seizure of the main body-cover threaded joints when they are used at very high temperatures, as in the case of steam traps. Generally, after their initial warming up, the screwing together thread of the cover and main body are irreversibly damaged whenever an attempt is made to remove the cover to carry out any adjustment, cleaning or maintenance operation. Because of this, what should in fact be a solution to reduce operating and maintenance costs does in fact become a cost increase factor for the user. All of this without taking into account the problem represented by the need to have a sealing joint between the main body and the cover in order to avoid the appearance of steam leaks through this threaded joint, which represents once again a weak point of the steam trap, given that a simple failure of this sealing joint, something that is not uncommon, means the complete destruction of the steam trap, as already commented. The substitution of this threaded joint by a welded one does not solve the problem, given that said substitution fully prevents the possibility of performing any maintenance operation, including the simple internal cleaning of the steam trap.

The steam trap advanced herein solves all of the above problems in a simple and efficient way, based on a single block conception of the main body or external housing and a miniaturization of its internal elements, being said concept applicable to all type of steam traps of the most different kinds. That is to say, the steam trap object of this invention is basically based on a reduction of its size and in the constitution of a single block assembly, doing thus away with the cover and, in consequence, with its corresponding sealing joint.

It is therefore obvious that the non existence of the cover further means the non existence of a cover-main body threaded union, fully solving the problem of seizure in respect of said now non existent joint. The size of the steam trap is reduced at the same time down to the limits of miniaturization, which causes an extremely significant reduction in respect of the usage of materials and of manufacturing costs. The non existence of the cover leaves in all of the internal elements of the steam trap in the open, allowing visual inspections to be easily performed, as well as cleaning, repair and maintenance operations, which significantly contributes towards a reduction of operating and maintenance costs.

The new miniaturized single block steam trap prototype may be applied to the manufacture of any type of steam trap, regardless of the kind of regulator used to control condensate discharge. It allows a reduction of manufacturing costs of up to 60% in respect of current manufacturing costs, saving that may be passed on to the user, so that it does therefore offer a significant financial interest, given that steam traps are widely used in all industrial sectors.

The miniaturized single block steam trap is also characterized by the fact that the valve seat of its internal regulator does also effect, besides its traditional function as an integral element of the regulator itself, some or all of the following additional simultaneous functions:

House and support all the remaining steam trap regulation elements.

Guides the plug in its closing and opening movements.

Provides the anchorage needed for the regulator adjustment mechanism.

To summarize, the steam trap object of this invention, being of the bimetallic type, is characterized because it does not have a cover, sealing joint and joining means (bolts and nuts or welds); with the added feature that its main body, as a single part body, effects at the same time seating functions, having specific means to allow the assembly and disassembly of the internal elements that make up the regulator, as well as a special shape of certain internal elements such as the filter, a washer acting as a wedge key and a guiding washer for the regulator plug carrying spindle.

In order to complement the description offered below and for the purpose of aiding a better understanding of the characteristics of the invention, a detailed description is made on the basis of a set of drawings annexed to this patent specification, forming an integral part thereof, and where, with a merely illustrative but not limitative character, the following has been duly represented:

Figure 1:
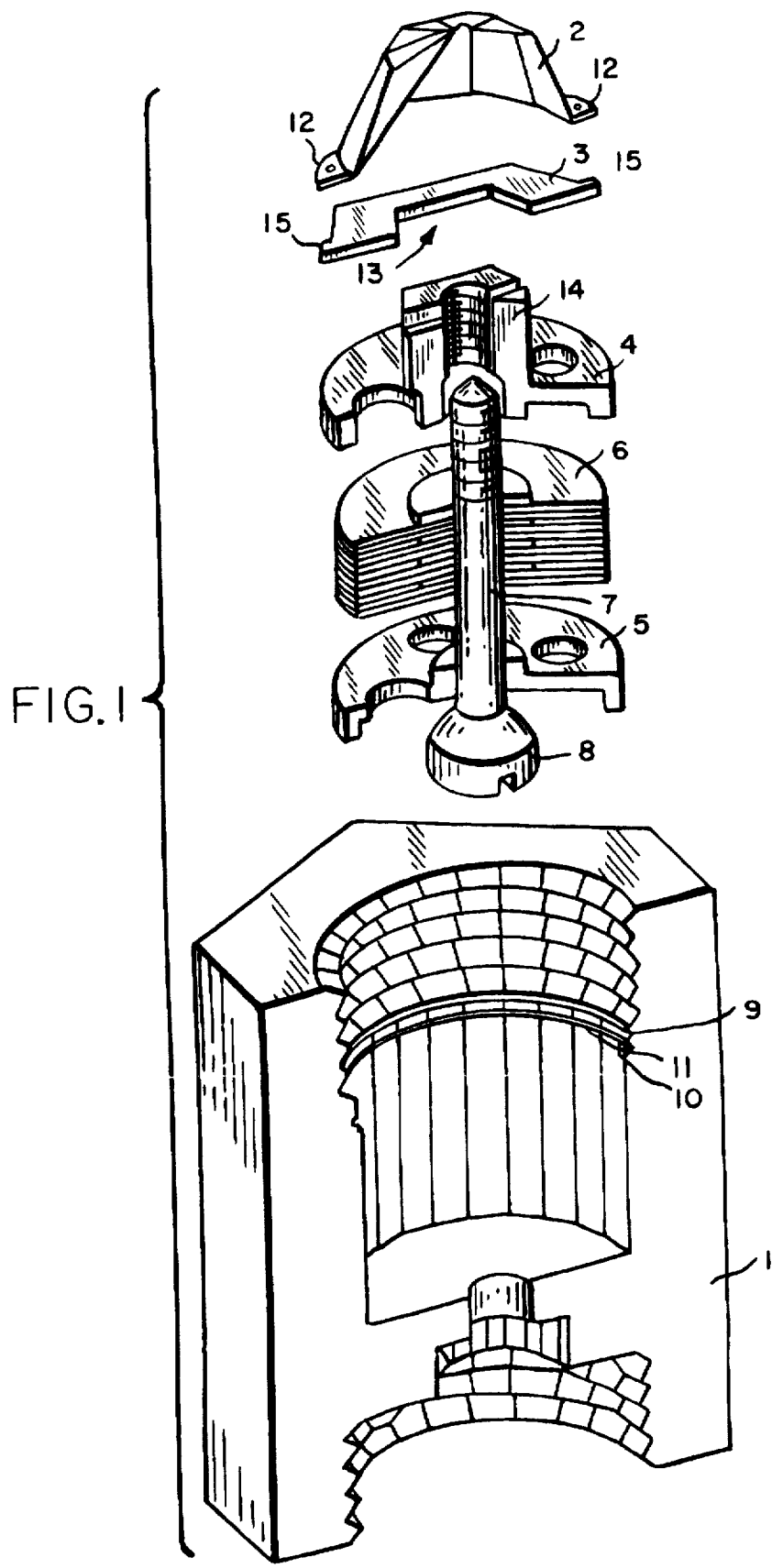
FIG. 1 represents a cut away exploded view of the various parts that make up the steam trap object of the invention.
Figure 2:
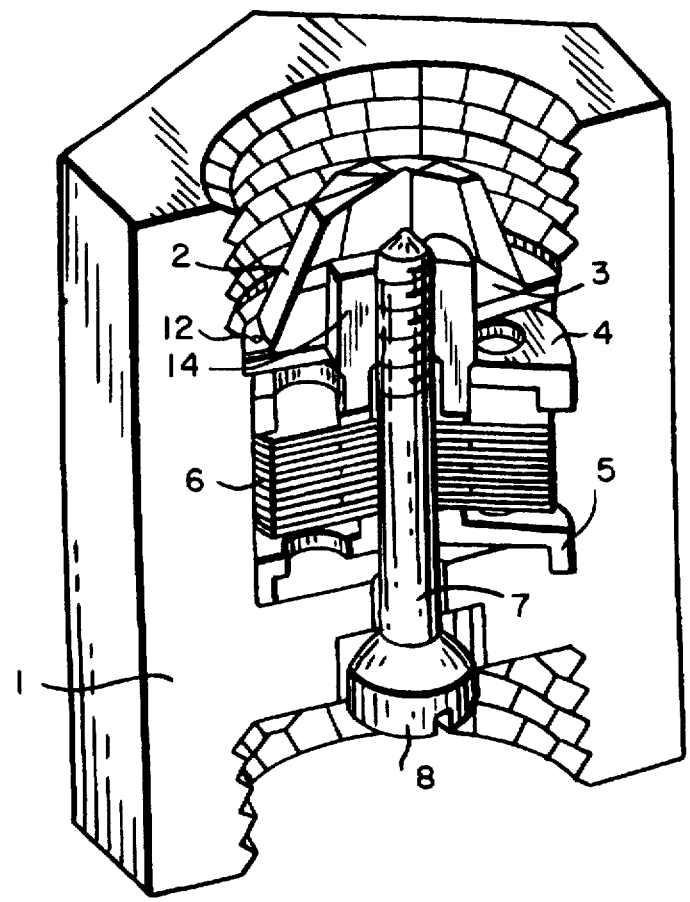
FIG. 2 represents a cut away perspective view of the steam trap object of the invention, with all of its components assembled.
Figure 3:
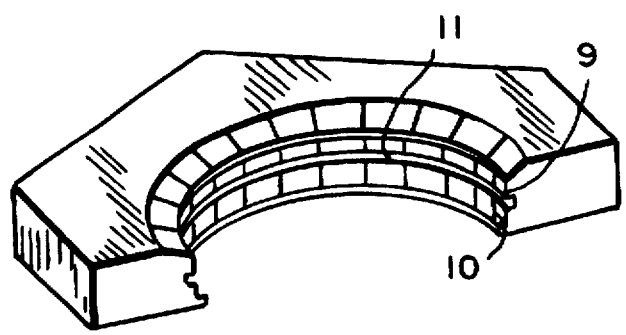
FIG. 3 represents cut away detail of the means provided within the main body for the assembly and fixing of the filter and washer acting as a wedge key.

As may be observed in the aforementioned figures, the steam trap object of the invention, is made up of a single part main body (1), inside which are assembled the elements that make up the regulator, being said elements a filter (2), a washer (3) acting as a wedge key, a nut (4) and a guiding washer (5) a bimetallic block or package (6) located between the two previous ones and a spindle (7) with a plug (8) at its lower end, which spindle (7) passes through the nut (4) and washer (5) and, of course, also through the bimetallic block or package (6). Said set of elements form the regulator that is located inside the body (1), as shown in FIG. 2.

The body (1), in correspondence with the area of location of the filter (2) and washer (3), has two diametrically opposed keyways (9) with two further diametrically opposed keyways (10), which pairs of keyways (9) and (10) are respectively located above and below an intermediate ring-shaped slot (11).

The filter (2) is further fitted with a couple of side fins (12) diametrally opposite each other, whereas the washer (3) acting as a wedge key is fitted with a polygonal passage (13) complementary of the V shaped configuration (14) of the nut (4). The washer is also fitted with fins (15) placed in diametral opposition.

In accordance with the aforementioned structure, the assembly of the above elements, as per the arrangement shown in the figures, is duly ensured by the fins (12) of the filter (2), fins that are housed in the slot (11) following their initial placement in the keyways (9) so that the filter (2) will turn whenever it reaches the level of the slot (11), thus remaining said fins, and therefore the filter, housed and held in the slot (11).

The washer (3) would have been previously positioned, arranging its fins (15) in the keyways (10). The V shaped (14) portion of the nut (4) is then located in the passage (13) of the washer (3), being said nut (4) prevented from turning, although capable of axial displacement.

The fins (12) of the filter (2) are conveniently deformed so as to effect a gentle pressure upon the upper and lower surfaces of the slot (11), preventing the free rotation of the filter in its housing.

The operation of the regulator is the normal one of a bimetallic thermostatic valve that opens below the previously set temperature and closes whenever said temperature is reached.

On the other hand the miniaturized single block steam trap object of this invention may be applied to the construction of any other kind of steam trap with a different type of regulator.

The assembly of the components of the regulator, as well as its aforementioned anchorage, allows the performance of adjustment changes of the steam trap discharge temperature from its lower surface, allowing the axial displacement of the nut (4) acting as guide for the plug (8) carrying spindle (7), preventing the turn of said nut (4) whenever the plug (8) carrying spindle (7) turns, turn which shall be effected from its lower end.

I claim:

1. An improved steam trap comprising:
   a single part body having a cavity and defining a regulator seat; and
   a regulator comprising a filter, a nut, a bimetallic package positioned between the nut and the regulator seat, and a spindle having a plug for engaging the regulator seat, said nut securing said bimetallic package to said spindle so that said bimetallic package controls the position of said plug relative to the regulator seat, said regulator being positioned within the cavity of said single part body and being accessible for inspection and handling for the purposes of assembly, disassembly and replacement in case of breakdown, whereby said single part body and said regulator constitute a miniaturized single block steam trap, wherein said single part body includes a ring-shaped slot on an inside surface of the cavity, a first pair of keyways above the ring-shaped slot and a second pair of keyways below the ring-shaped slot, wherein said regulator further comprises a washer having fins for engaging the second pair of keyways, said washer having a polygonal central passage for engaging said nut and wherein said filter includes fins for engaging said ring-shaped slot, said first pair of keyways permitting the fins of said filter to be anchored in said ring-shaped slot.

* * * * *